United States Patent Office 3,481,423
Patented Dec. 2, 1969

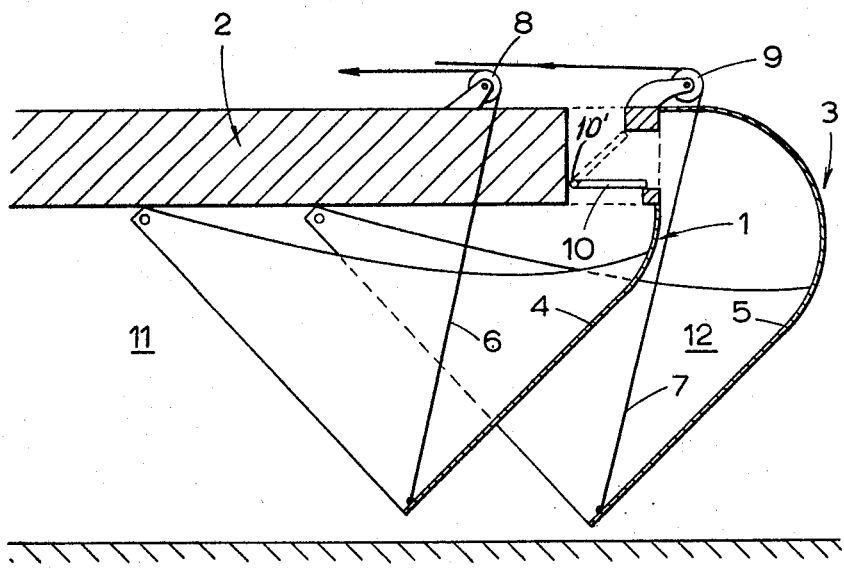

3,481,423
MEANS TO TRIM AIR CUSHION VEHICLES
Peter Heron Winter, Cowes, Isle of Wight, England, assignor to Cushioncraft Limited, St. Helens, Isle of Wight, England, a British company
Filed Oct. 20, 1967, Ser. No. 678,774
Claims priority, application Great Britain, Oct. 25, 1966, 47,917/66
Int. Cl. B60v 1/00, 1/16
U.S. Cl. 180—117                                                5 Claims

ABSTRACT OF THE DISCLOSURE

Means for trimming an air cushion vehicle by alteration of the centre of pressure of the cushion, comprising an inner skirt and a parallel outer skirt extending around at least a portion of the periphery of the vehicle, and control means arranged to admit cushion pressure air to the outer skirt to render said skirt operative or to withhold said cushion pressure air from said outer skirt and render it inoperative.

---

This invention relates to air cushion vehicles, and to the problem of trimming such vehicles. It has already been proposed to trim air cushion vehicles by the use of ballast tanks containing fuel or water. Thus, for trimming in the fore and aft sense, a forward ballast tank may be connected to an after tank by a pump, which pumps liquid to either end of the vehicle as desired. Alternatively, simple ballast weights have been proposed. These methods have serious disadvantages, since they necessitate the carrying of dead weight, so reducing the payload.

It has also been proposed to employ elevators in a slipstream. This has the disadvantage that the elevators are only effective at full thrust.

It has further been proposed in a peripheral jet vehicle that there be two jets on each side, one inboard of the other. By manipulation of the jet efflux it is suggested that the centre of pressure may be shifted to create a tilting couple.

It is an object of the invention to provide simple means whereby the centre of pressure of the cushion may be shifted to achieve the trimming of a skirted vehicle and especially a plenum chamber vehicle.

According to the invention, means for trimming an air cushion vehicle by alteration of the centre of pressure of the cushion comprise an inner skirt and a parallel outer skirt extending around at least a portion of the periphery of the vehicle, and control means arranged to admit cushion pressure air to the outer skirt to render said skirt operative or to withhold said cushion pressure air from said outer skirt and render it inoperative.

Conveniently at least one of the skirts may be retractable and flexible, and conveniently also the skirts extend across the rear of the vehicle.

At least one of the skirts may be an inflatable skirt.

Two arrangements of inner and outer skirts may be provided along opposite portions of the periphery of the vehicle, and the respective control means of the arrangements may be so associated that the inner skirt of one arrangement and the outer skirt of the other arrangement are simultaneously operative.

The accompanying single figure of drawing diagrammatically shows an embodiment of the invention as applied to a plenum chamber vehicle.

It will be understood that a plenum chamber vehicle has flexible skirts, which may be segmented if desired, extending around its sides and bow in orthodox fashion. The skirts according to the invention may also be segmented, and extend across the rear of the vehicle and comprise an inner flexible skirt 1 secured to the outer periphery of the hull 2 of the vehicle at the lower edge thereof and an outer flexible skirt 3 secured some distance above the line of attachment of the inner skirt. The lower edges 4, 5 of the skirts are parallel. Both skirts are provided with simple retraction means consisting of cables 6, 7 secured to the lower edges of the skirts at intervals and passing around pulleys 8, 9 on the hull 2 with suitable known means (not shown) to enable either of the skirts to be retracted independently of the other when desired under suitable conditions.

Along the underside of the rear of the hull there are provided one or more simple valves, each valve consisting of a pivoted flap 10, pivoted as at 10′, and movable from the horizontal position shown to an inclined position, shown in dotted line. In its horizontal position shown, the flap 10 maintains the plenum chamber 11 defined by the inner skirt 1 and allows the space 12 between the two skirts 1 and 2 to be open to atmosphere, while in its inclined (dotted) position it opens a passage to enable cushion air to pass outwardly over the top of the inner skirt 1 and into the space 12 enclosed by the outer skirt 2.

In operation, let it be supposed that the flap 10 is in its horizontal position, so confining the cushion of air to the inner flexible skirt 1. The outer skirt 2 cannot maintain pressure inside it as it is open to atmosphere and may be retracted by cable 7 and is so maintained until trimming is desired. If retracting mechanism is not fitted, the outer skirt 2 may be allowed to trail. The outer skirt 2 is, when fitted with the retracting mechanism, then lowered and the flap 10 is raised to its inclined position to permit cushion air to pass out to fill the outer skirt, and at the same time the flap seals the outer skirt from atmosphere and the rear periphery of the cushion is thus moved back. There is now equal pressure (cushion pressure) on either side of the inner skirt 1, which may therefore be retracted out of the way or allowed to trail as most convenient. Since the cushion periphery at the rear has been moved back, the centre of pressure of the cushion has also moved back by a lesser amount, but the centre of gravity remains fixed and there has therefore been produced a tilting couple giving the effect of a forward shift of the centre of gravity.

If it is desired to return to the previous state of trim, the valve 10 is lowered to its horizontal position so as to cut off the cushion pressure air from the outer skirt and open it to atmosphere, and the inner skirt is lowered to its previous operative position and the outer skirt is retracted.

I claim:

1. An air cushion vehicle comprising a chamber defined by depending skirt means and open to a surface over which the vehicle travels, means for introducing a cushion of air into said chamber, means for trimming the vehicle by alteration of the center of pressure of the air cushion, said trimming means including in part said skirt means and further comprised of an inner skirt and an outer skirt extending around a portion of the periphery of the vehicle, said inner and outer skirts being disposed in parallel relationship with respect to one another, and defining a space therebetween open to said surface, a path for providing communication between and interconnecting said cushion air chamber, said space and the atmosphere, and control means in said path for controlling the flow of cushioned air from the chamber to the space defined by said inner and outer skirts to alter the centre of pressure in the chamber while simultaneously obstructing at all times the flow of air between said chamber and atmosphere, said control means being movable between a position in which said path between the cushion air chamber and said space is established and communication between the atmosphere and said space is precluded, and another position in which communication between the atmosphere and said space is established and communication between the cushion air chamber and said space is precluded, said trimming means being operable only at said portion of the vehicle to alter the centre of pressure of the cushion air within said chamber.

2. An air cushion vehicle as defined in claim 1, wherein at least one of said skirts is retractable.

3. An air cushion vehicle as defined in claim 1, wherein at least one of said skirts is flexible.

4. An air cushion vehicle as defined in claim 1, wherein said skirts extend across the rear of the vehicle.

5. An air cushion vehicle as defined in claim 1, wherein at least one of the skirts is inflatable.

References Cited

UNITED STATES PATENTS

| | | | |
|---|---|---|---|
| 3,181,636 | 5/1965 | Cockerell | 180—118 |
| 3,208,543 | 9/1965 | Crowley | 180—121 |
| 3,240,282 | 3/1966 | Taylor | 180—128 |
| 3,291,237 | 12/1966 | Hopkins et al. | 180—127 |
| 3,291,238 | 12/1966 | Eggington | 180—128 |
| 3,362,499 | 1/1968 | Tripp | 180—121 |

FOREIGN PATENTS

| | | |
|---|---|---|
| 935,620 | 8/1963 | Great Britain. |
| 1,043,351 | 9/1966 | Great Britain. |

A. HARRY LEVY, Primary Examiner

U.S. Cl. X.R.

180—127